118,105

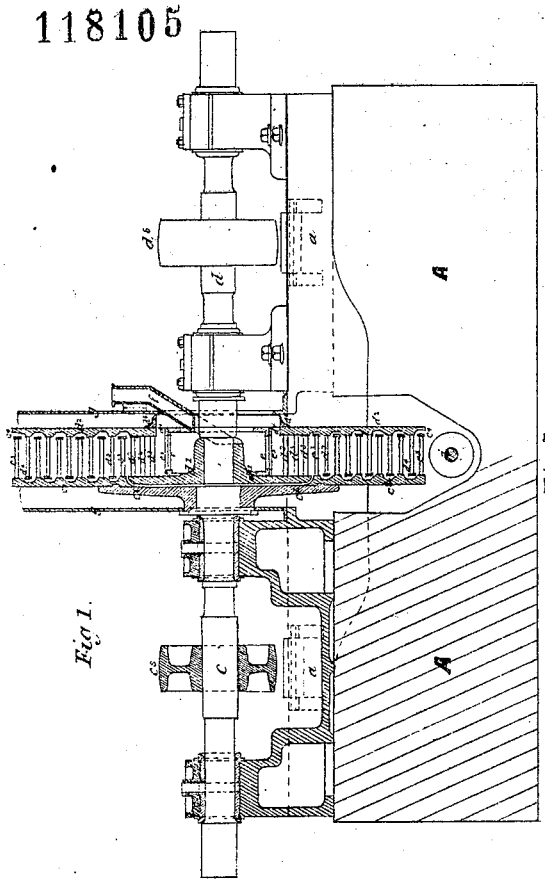
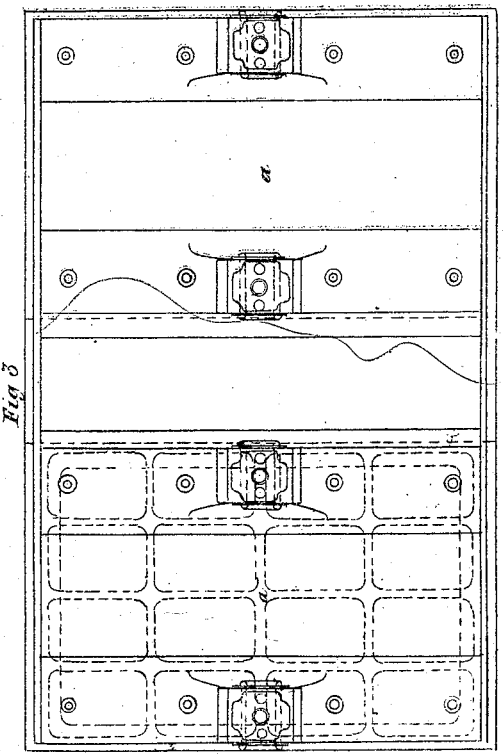
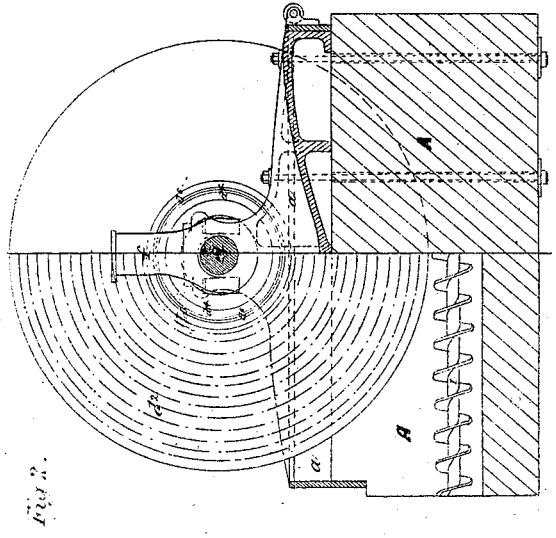

UNITED STATES PATENT OFFICE.

THOMAS CARR, OF BRISTOL, GREAT BRITAIN.

IMPROVEMENT IN FLOUR.

Specification forming part of Letters Patent No. 118,105, dated August 15, 1871.

*To all whom it may concern:*

Be it known that I, THOMAS CARR, of the city and county of Bristol, in the Kingdom of Great Britain and Ireland, have invented an Improved Flour and Process of Making the same, of which the following is a specification:

I have discovered that wheat may be reduced to flour by percussion while it is unsupported or falling freely, or is being projected through the air, the said percussion resulting from blows of continuous-acting beaters striking at an adequate speed the unsupported wheat while it is thus so falling freely or being projected through the air, and that the flour so produced has peculiar and superior qualities, differing very materially from flour of wheat as produced by the ordinary process of reducing it between two acting surfaces, which temporarily support it while undergoing the operation, such as in grinding it between a pair of millstones, or crushing it between parallel rolls, or stamping it between a pestle and mortar.

The advantages derived from this new system of manufacture are as follows: The flour obtained is of a more granular character, which enables it to absorb more water and produce a lighter and more wholesome bread. The bran, also, is scaled off more effectively, and in a form admitting of being subsequently more perfectly separated from the flour by the ordinary dressing-sieves or bolting-machines; and, moreover, from the fact of its being dispersed through the air in the surrounding chamber in the process of reduction, (being thrown from the machine in a radiating shower,) greater facilities are thereby afforded for the lighter cerealine and other deleterious matters being thoroughly extracted by an exhaust current of air than the ordinary process of manufacture admits of, and thus a better and purer flour is obtained, while at the same time the cost of manufacture is greatly reduced both in the expenditure of motive power and in repairs, and consequently a flour is obtained from which a cheaper and better bread can be made than has been heretofore practicable.

My invention consists of flour reduced from wheat and other seeds by subjecting the grain to the percussion of any suitable continuous-acting beaters traveling at an appropriate speed, and striking the said wheat while it is unsupported and falling freely or is being projected through the air. In the preceding explanation I have only referred to the grain of wheat, but my system or mode of manufacture is applicable for producing flour from maize, beans, pease, and other seeds. My invention further consists of the process described hereafter of producing the said flour.

In the accompanying drawing, Figure 1 is a longitudinal side elevation, partly in section, of the machine for reducing wheat and other seeds to fine or coarse flour. Fig. 2 is an end or front section of the same machine, each half of the section being taken in a different plane; and Fig. 3 is a plan of the base-plate and pedestals for the machine.

A is the foundation. $a$ is the base-plate, formed and connected together and secured to the foundation, as shown. The base-plates have pedestals cast in them for the two shafts. These shafts $c$ and $d$ are formed of steel, with the disks for the cages keyed thereon. The disks are of wrought-iron plate, and the bars, by preference, of steel. On the shaft $c$ a disk, $c^1$, is keyed, and to this disk an annular disk, $c^2$, is riveted, into which all the bars $c^3$ of one set of cages are secured, the ends of each set of bars forming a cage, being connected together in a ring, $c^4$. On the shaft $d$ a disk, $d^1$, is secured, in which the inner ends of the bars $d^3$, forming the first three cages, are secured, the outer ends of these bars being all secured in one annular disk, $d^2$, in which the bars $d^3$ are secured that form the cages which come between those carried by the large disk on the shaft $c$. The ends of the bars forming each of the cages carried by the annular disk $d^2$ are connected together in a ring, $d^4$, and each disk is recessed to give space for the rings of each cage. In the machine shown by the drawing there are fourteen cages, the first three cages from the center containing 34, 40, and 46 bars, respectively, and all rotate in the same direction, while the other eleven cages contain in succession 52, 58, 62, 70, 74, 79, 85, 91, 98, 150, and 158 bars, respectively, which rotate in opposite directions—that is, the first, second, third, fifth, seventh, ninth, eleventh, and thirteenth cages all rotate in one direction, and the fourth, sixth, eighth, tenth, twelfth, and fourteenth cages all in the other direction. $e'$ is a cylinder with a series of slits or holes in it, all round, and it is secured to the disk $d^1$; and $e$ is another similar cylinder having corresponding slits or holes, secured inside the first named, but so that it can be adjusted by slightly rotating it to make the slits or holes in each correspond more or less perfectly, and thus increase or decrease the narrowness of the slits and give more or less space for the seed to pass through, the cylinder being secured, after adjustment, by set-screws passing through short concentric slots in the flanges, or by other means. There is an annular space, $d^\times$, left for air, between the cylinder and annular disk $d^2$. The front of the casing $g$ (the sides of which are partly shown in Fig. 1) is left open to admit air, and to the casing a pipe, $f$, is fixed having an outlet branch on each side of the shaft $d$, through which the grain is fed. The space between the front of the disk $d^2$ and the casing is closed by a projecting ring, $d^6$, secured to the disk, as shown. $c^5$ and $d^5$ are pulleys for the driving-belts, the shafts $c$ and $d$ being driven in opposite directions by means of an open and crossed strap. A wrought-iron boiler-plate casing, $g$, (partly shown,) of any convenient form, is used to inclose the cages, and in its upper part a pipe is fixed, which is connected with an exhausting fan that withdraws the cerealine and discharges it into a suitable chamber, the draught being moderated to withdraw only the light cerealine and not the flour.

The grain to be operated upon is introduced into the inner chamber formed by the two cylinders, (by the pipe and hopper $f$,) and its escape therefrom is retarded by the narrowness of the exit-slits formed between the two cylinders to such extent that it takes an entire revolution or thereabout before the grain received, when passing the feeding-spout, is fully discharged from the rotating chamber. Thus every part of the cages receives a due proportion and comes into simultaneous operation throughout their entire circumference.

To increase the draught through the machine a few narrow fan-blades may be applied to the outer periphery of the cages. The mixed flour and bran will fall to the lower part of the recess below the cages, and may be removed by a screw, $i$, as shown.

The shafts, disks, rings, and pulleys are turned up as true, and are balanced as accurately as possible, and the shafts $c$ and $d$ are each driven (in reverse directions) at about six hundred revolutions per minute.

I claim as my invention—

1. The flour produced by the within-described process, and having the granular character and other qualities herein set forth.

2. The within-described process of producing the said flour.

In testimony whereof I have signed my name to this specification in the presence of two subscribing witnesses.

THOMAS CARR.

Witnesses:
 GEORGE HENRY WOOKEY,
 EDMUND HAYNES BELL.